United States Patent
Kitazume

(10) Patent No.: US 12,012,165 B2
(45) Date of Patent: Jun. 18, 2024

(54) CONTROL DEVICE FOR ELECTRIC POWER STEERING DEVICE AND CONTROL METHOD FOR THE SAME

(71) Applicant: NSK LTD., Tokyo (JP)

(72) Inventor: Tetsuya Kitazume, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/787,088

(22) PCT Filed: Oct. 29, 2021

(86) PCT No.: PCT/JP2021/040170
§ 371 (c)(1),
(2) Date: Jun. 17, 2022

(87) PCT Pub. No.: WO2022/137808
PCT Pub. Date: Jun. 30, 2022

(65) Prior Publication Data
US 2024/0116567 A1  Apr. 11, 2024

(30) Foreign Application Priority Data

Dec. 23, 2020 (JP) .................................. 2020-213947

(51) Int. Cl.
*B62D 6/08* (2006.01)
*B62D 6/10* (2006.01)

(52) U.S. Cl.
CPC ..................................... *B62D 6/08* (2013.01)

(58) Field of Classification Search
CPC . B62D 6/08; B62D 6/10; B62D 5/046; B62D 5/0463; B62D 5/0466;
(Continued)

(56) References Cited

U.S. PATENT DOCUMENTS 9,592,850 B1   3/2017 Kataoka et al.
9,731,756 B2 * 8/2017 Matsuo .................. B62D 6/002
(Continued)

FOREIGN PATENT DOCUMENTS

JP   2008-68677 A   3/2008
JP   2008-273474 A  11/2008
(Continued)

OTHER PUBLICATIONS

International Search Report (PCT/ISA/210) dated Jan. 18, 2022, issued by the International Searching Authority in counterpart International Application No. PCT/JP2021/040170.
(Continued)

*Primary Examiner* — Jaime Figueroa
(74) *Attorney, Agent, or Firm* — Sughrue Mion, PLLC

(57) ABSTRACT

Provided is a control device for an electric power steering device including a first control portion that derives a first command value based on a steering torque and a second control portion that derives a second command value based on a target command value for a driving support function, where the first control portion generates the first command value by extracting a command value corresponding to a vibration suppression component from a command value including the vibration suppression component derived from the steering torque, adjusting the derived command value according to an operating state of a function of the second control portion, and adding the extracted command value to the adjusted command value.

12 Claims, 11 Drawing Sheets

(58) Field of Classification Search
CPC .... B62D 5/0469; B62D 5/0472; B62D 6/008; B62D 15/025; B62D 6/002; B62D 7/159; B62D 7/15; B62D 5/0457; B62D 5/04
USPC .......................................................... 701/1, 41
See application file for complete search history.

(56) References Cited

U.S. PATENT DOCUMENTS

| | | | | |
|---|---|---|---|---|
| 10,286,946 | B2* | 5/2019 | Nishimura | B62D 15/025 |
| 10,363,958 | B2* | 7/2019 | Otto | B62D 5/0463 |
| 10,577,015 | B2* | 3/2020 | Itamoto | B62D 15/027 |
| 10,981,427 | B2* | 4/2021 | Hachisuka | B60G 17/016 |
| 11,370,479 | B2* | 6/2022 | Kim | B62D 5/0493 |
| 11,572,097 | B2* | 2/2023 | Tamaizumi | B62D 15/025 |
| 2008/0091320 | A1 | 4/2008 | Sakai | |
| 2008/0277192 | A1 | 11/2008 | Nishimura | |
| 2012/0123643 | A1* | 5/2012 | Limpibuntering | B62D 1/286 701/42 |
| 2012/0185132 | A1 | 7/2012 | Kezobo et al. | |
| 2013/0103264 | A1* | 4/2013 | Takashima | B62D 5/0472 701/41 |
| 2016/0244092 | A1* | 8/2016 | Matsuo | B62D 6/002 |
| 2017/0253265 | A1* | 9/2017 | Nishimura | B62D 6/008 |
| 2018/0029640 | A1* | 2/2018 | Otto | G05D 1/021 |
| 2019/0016188 | A1* | 1/2019 | Hachisuka | B60G 17/016 |
| 2019/0135334 | A1* | 5/2019 | Itamoto | B62D 15/025 |
| 2019/0300044 | A1 | 10/2019 | Tsubaki | |
| 2020/0223477 | A1* | 7/2020 | Tamaizumi | B62D 5/0463 |
| 2021/0094611 | A1* | 4/2021 | Kim | B62D 5/0493 |

FOREIGN PATENT DOCUMENTS

| | | |
|---|---|---|
| JP | 2017-210009 A | 11/2017 |
| JP | 2018-12390 A | 1/2018 |
| WO | 2011/052470 A1 | 5/2011 |
| WO | 2017/213119 A1 | 12/2017 |

OTHER PUBLICATIONS

Written Opinion (PCT/ISA/237) dated Jan. 18, 2022, issued by the International Searching Authority in counterpart International Application No. PCT/JP2021/040170.

* cited by examiner

CONTROL DEVICE FOR ELECTRIC POWER STEERING DEVICE AND CONTROL METHOD FOR THE SAME

CROSS-REFERENCE TO RELATED APPLICATIONS

This application is a National Phase Entry of PCT International Application No. PCT/JP2021/040170, filed on Oct. 29, 2021, which claims priority to Japanese Patent Application No. 2020-213947 filed on Dec. 23, 2020, the contents of all of which are incorporated herein by reference in their entirety.

TECHNICAL FIELD

The present invention relates to a control device for an electric power steering device and a control method for the same.

BACKGROUND ART

In recent years, vehicles equipped with various driving support functions have appeared in response to a level of autonomous driving, Examples of the driving support function include a lane maintenance function and a lane change function by an advanced driver-assistance systems (ADAS). Based on this situation, it is necessary to control an electric power steering device according to a content of the driving support function.

It is assumed that a driver operates a steering wheel while the driving support function as described above is operating. In such a case, it is necessary to adjust a control value by the driving support function and a control value based on steering by the driver. For example, in Patent Document 1, a method for controlling a motor of an electric power steering by setting a ratio with respect to a control value according to a steeling torque and a control value based on an automatic steering function and adjusting the control values based on the ratio is disclosed.

PRIOR ART DOCUMENT

Patent Document

Patent Document 1: JP-A-2008-068677

SUMMARY OF INVENTION

Technical Problem

In the electric power steering device, the command value based on the steering torque by the driver may be controlled including, for example, a signal which suppresses vibration caused by an input from a downstream side (tire side) of the electric power steering device. In such a configuration, when the ratio of the command value based on the steering torque is reduced by giving priority to the control value based on the automatic steering function as described above, the signal which suppresses the vibration is also reduced, and a vibration suppression effect is reduced. As a result, vibration is generated and transmitted to the driver as unpleasant vibration through a steering wheel, which also affects the operability of the driver. In the driving support function describe above, operation information for the electric power steering device such as hands-on or hands-off detection is used, but vibration may be generated and this may also affect these operation detections.

In view of the problem described above, it is an object of the present invention to efficiently suppress vibration with a simple configuration in consideration of a driving support function.

Solution to Problem

In order to solve the problem described above, the present invention has the following configurations. That is, there is provided a control device for an electric power steering device including:
a first control portion that derives a first command value based on a steering torque applied to a steering shaft of the electric power steering device;
a second control portion that derives a second command value based on a target command value for a driving support function; and
a synthesizing portion that synthesizes the first command value and the second command value to generate a command value of the electric power steeling device, where
the first control portion includes,
a derivation portion which derives a command value including a vibration suppression component from the steering torque,
an extraction portion which extracts a command value corresponding to the vibration suppression component from the command value derived by the derivation portion,
an adjustment portion which adjusts the command value derived by the derivation portion according to an operation state of a function of the second control portion, and
an addition portion which generates the first command value by adding the command value extracted by the extraction portion to the command value adjusted by the adjustment portion.

In addition, another aspect of the present invention has the following configuration. That is, there is provided a control method for an electric power steering device including:
a first deriving step of deriving a first command value based on a steering torque applied to a steering shaft of the electric power steering device;
a second deriving step of deriving a second command value based on a target command value for a driving support function; and
a synthesizing step of synthesizing the first command value and the second command value to generate a command value of the electric power steering device, where
in the first deriving step,
a command value including a vibration suppression component is derived from the steering torque,
a command value corresponding to the vibration suppression component is extracted from the derived command value,
the derived command value is adjusted according to an operation state of the second deriving step, and
the first command value is generated by adding the extracted command value to the adjusted command value.

Advantageous Effects of Invention

According to the present invention, the present invention can efficiently suppress vibration with a simple configuration in consideration of a driving support function.

DESCRIPTION OF EMBODIMENT

Hereinafter, embodiments for carrying out the present invention will be described with reference to the drawings and the like. The embodiments described below are embodiments for explaining the present invention, and are not intended to be interpreted in a limited manner. Also, not all the configurations described in each embodiment are essential configurations for solving the problems of the present invention. In each drawing, the same component is given the same reference numbers and letters to indicate a correspondence relationship.

First Embodiment

Hereinafter, a first embodiment of the present invention will be described.

Configuration Overview

Figure 1:
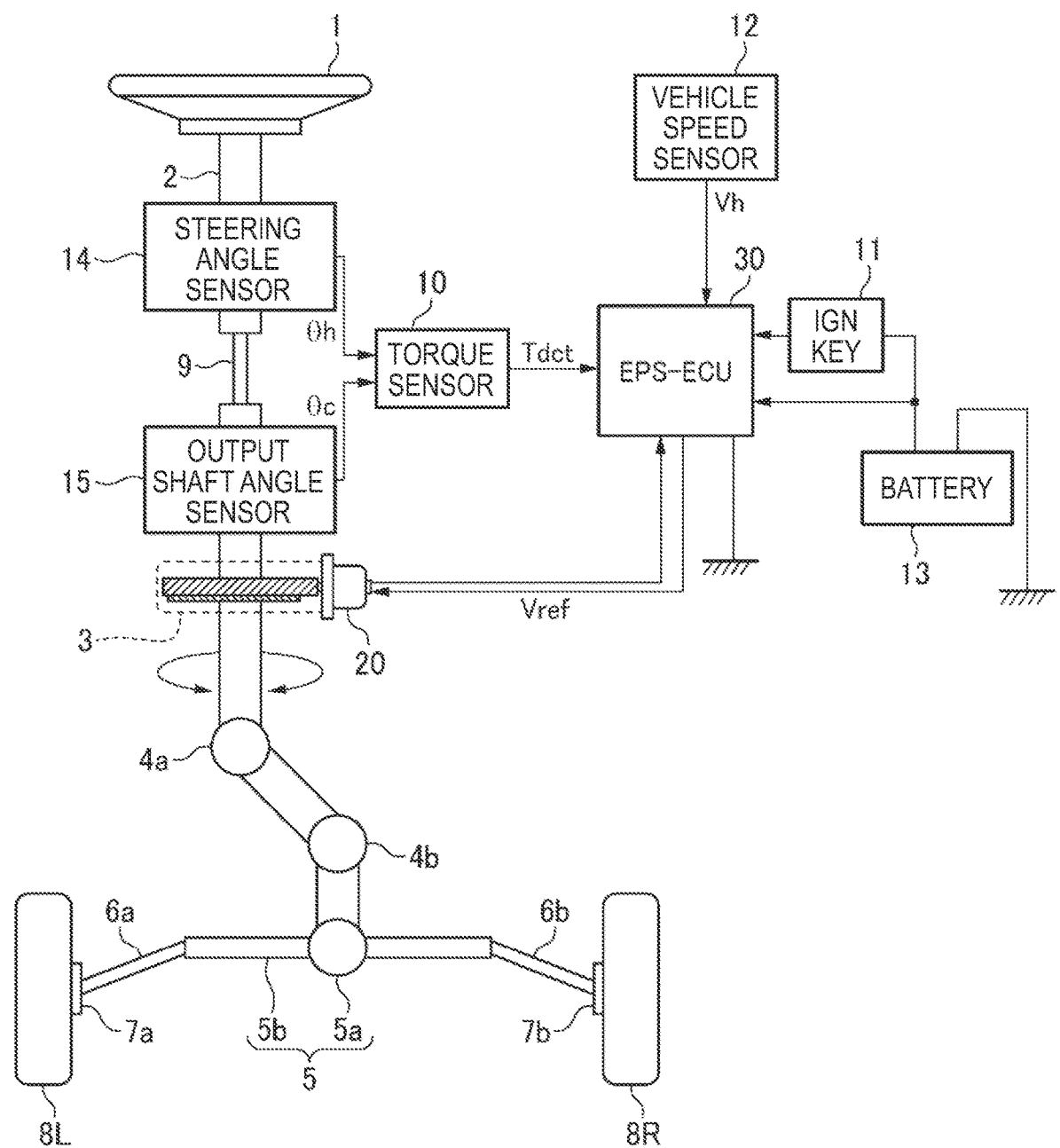
FIG. 1 is a configuration diagram illustrating an example of an outline configuration of an electric power steering device according to the present invention.

FIG. 1 illustrates a configuration example of an electric power steering device according to the first embodiment. A steering wheel 1 is a steering wheel for a driver to perform a steering operation. A steering shaft 2 of the steering wheel 1 is connected to steered vehicle wheels 8R and 8L via a reduction gear 3 (worm gear) forming a reduction mechanism, universal joints 4a and 4b, a pinion rack mechanism 5, tie rods 6a and 6b and hub units 7a and 7b.

The steering shaft 2 is configured by connecting an input shaft on the steering wheel 1 side and an output shaft on the pinion rack mechanism 5 side via a torsion bar 9. The pinion rack mechanism 5 has a pinion 5a connected to a pinion shaft (not illustrated) to which steering force is transmitted from the universal joint 4b, and a rack 5b which meshes with the pinion 5a. A rotational motion transmitted to the pinion 5a is converted into a straight motion in a vehicle width direction by the rack 5b.

The steering shaft 2 is provided with a torque sensor 10 which detects a steering torque $T_{dct}$ applied to the torsion bar 9. Further, the steering shaft 2 is provided with a steering angle sensor 14 which detects a steering angle $θ_h$ indicating a rotation angle around an axis of the steering shaft 2 on the steering wheel 1 side (input shaft side). Further, the steering shaft 2 is provided with an output shaft angle sensor 15 which detects an output shaft angle θc indicating a rotation angle around an axis of the steeling shaft 2 on the pinion rack mechanism 5 side (output shaft side). That is, the steering angle sensor 14 detects the rotation angle on the input shaft side with respect to the torsion bar 9 as the steering angle $θ_n$, and the output shaft angle sensor 15 detects the rotation angle on the output shaft side with respect to the torsion bar 9 as the output shaft angle θc. The torque sensor 10 detects the steering torque $T_{dct}$ based on the twist of the torsion bar 9 caused by a difference between the steering angle $θ_h$ and the output shaft angle θc. The steering angle sensor 14 and the output shaft angle sensor 15 may be integrally configured. In FIG. 1, for the ease of explanation, the steering shaft 2 and the torque sensor 10 are illustrated separately, but the steeling shaft 2 and the torque sensor 10 may be integrated. The configuration of the torque sensor 10 is not particularly limited, and for example, a sleeve type or a ring type sensor which detects torque from the twist of the torsion bar 9 may be used. In the following description, the steering wheel 1 side of the steering shaft 2 is also referred to as an upstream side, and the pinion rack mechanism 5 side is also referred to as a downstream side.

The steering torque $T_{dct}$ detected by the torque sensor 10 includes the torque generated by an input (disturbance, or the like) from the downstream side, as well as the driver torque based on an operation of the steering wheel 1 by the driver. A command value based on the steering torque $T_{dct}$ is corrected so as to suppress vibration caused by the input on the downstream side. The control here will be described below with reference to the figure.

A steering assist motor 20 which assists the steering force with respect to the steering wheel 1 is connected to the steering shaft 2 via the reduction gear 3. Electric power is supplied, from the battery 13, to an electric power steering-electronic control unit (EPS-ECU) 30, which is a controller for controlling an EPS device, and an ignition key signal is input to the EPS-ECU via an ignition (IGN) key 11. Means for applying a steering assist force to the steering shaft 2 is not limited to a motor, and various types of actuators may be used.

The EPS-ECU 30 calculates a current command value as an assist command value based on the steering torque $T_{dct}$ detected by the torque sensor 10 and a vehicle speed $V_h$ detected by a vehicle speed sensor 12. Further, the EPS-ECU 30 controls the electric power supplied to the steering assist motor 20 by a voltage control command value corresponding to a current command value based on the steering torque $T_{dct}$ and a current command value based on a driving support function. The steering assist motor 20 operates the reduction gear 3 based on the voltage control command value $V_{ref}$ input from the EPS-ECU 30, and performs assist control for the steering wheel 1.

The electric power steering device according to the present embodiment can be mounted on, for example, a vehicle (not illustrated) whose traveling can be controlled by autonomous driving (AD) or ADAS. Examples of the driving support function include a lane maintenance function and a lane change function by an ADAS function, but the types thereof are not particularly limited. In the following description, the ADAS function will be described as an example. The driving support function according to the present embodiment is provided at least by controlling the steering angle of the electric power steering device as an automatic steering function in addition to steering by the driver. Therefore, the EPS-ECU 30 also calculates the current command value according to a driving support function provided by the vehicle.

The EPS-ECU 30 may include, for example, a computer including a processor and peripheral components such as a storage device. The processor may be, for example, a central processing unit (CPU) or a micro-processing unit (MPU). The storage device may include any of a semiconductor storage device, a magnetic storage device, and an optical storage device. The storage device may include a memory such as a register, a cache memory, and a read only memory (ROM) and a random access memory (RANI) used as a main storage device. The function of the EPS-ECU 30 described below is realized by, for example, the processor of the EPS-ECU 30 executing a computer program stored in the storage device.

Figure 2:
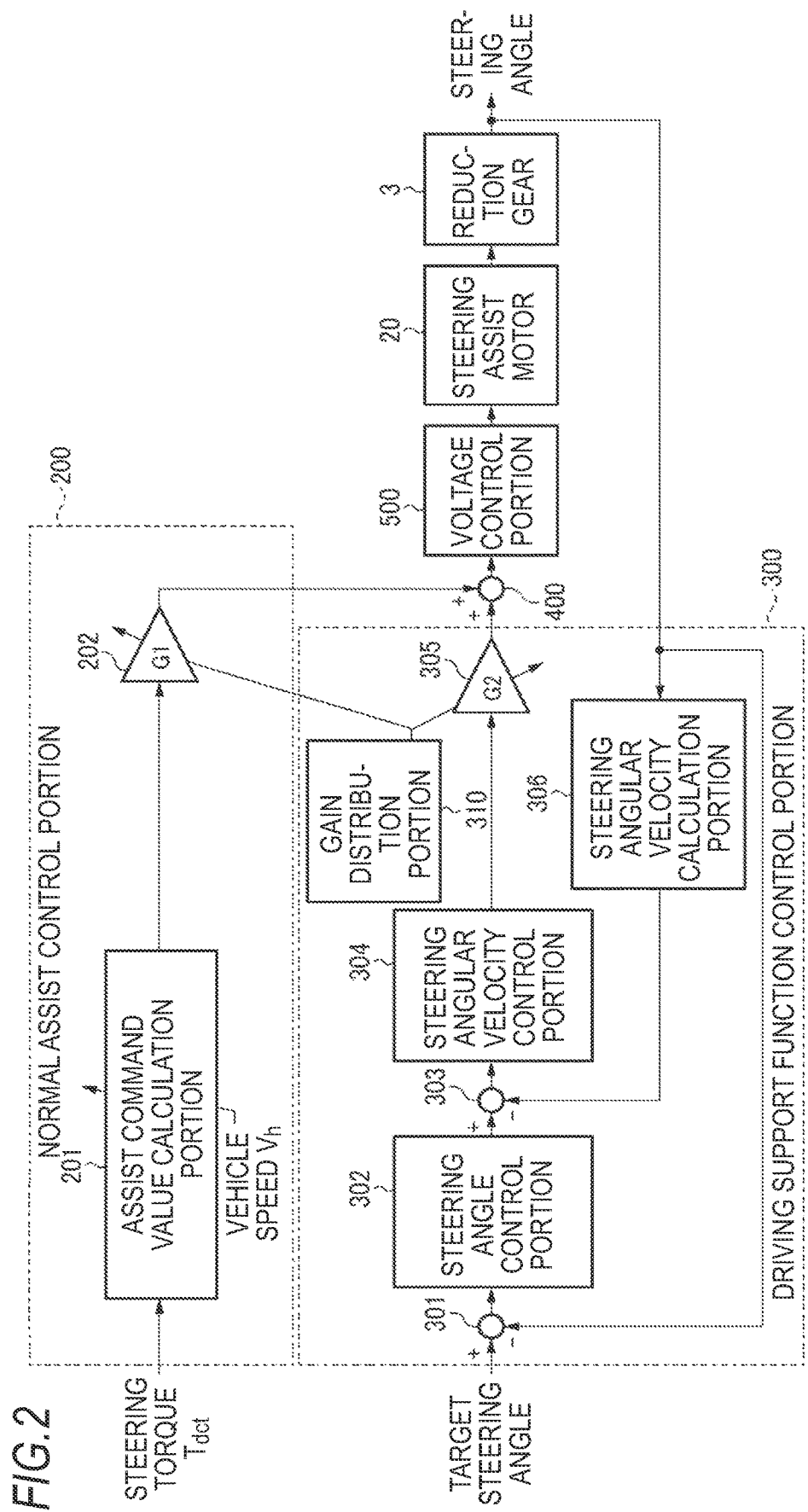
FIG. 2 is a block diagram illustrating an example of a functional configuration in an example of the related art.

The EPS-ECU 30 may be formed by dedicated hardware for executing each information processing described below. For example, the EPS-ECU 30 may include a functional logic circuit set in a general-purpose semiconductor integrated circuit. For example, the EPS-ECU 30 may have a programmable logic device (PLD) or the like such as a field-programmable gate array (FPGA), Functional Configuration First, an example of a functional configuration of the related art will be described. FIG. 2 is a block diagram illustrating an example of a functional configuration of the EPS-ECU in an example of the related art. Here, it is configured to include a normal assist control portion 200 which outputs an assist command value based on the steering torque Tact detected by the torque sensor 10 and a driving support function control portion 300 which outputs a command value based on a target steering angle by the ADAS function or the like. The target steering angle is given to the EPS-ECU 30 from an ADAS-ECU (not illustrated) which controls the ADAS function. The ADAS-ECU (not illustrated) may also have the same hardware configuration as the EPS-ECU 30. The command values output from each of the normal assist control portion 200 and the driving support function control portion 300 are added by an adder 400 and output to a voltage control portion 500. The voltage control portion 500 outputs the voltage control command value $V_{ref}$ for controlling the steering assist motor 20 based on the input command value. The normal assist control portion 200, the driving support function control portion 300, the adder 400, and the voltage control portion 500 are realized by the EPS-ECU 30.

The normal assist control portion 200 is configured to include an assist command value calculation portion 201 and a gain setting portion 202. The assist command value calculation portion 201 calculates the assist command value based on the steering torque Lot and the vehicle speed $V_h$ of a vehicle (not illustrated) on which the electric power steering device is mounted. The vehicle speed $V_h$ of the vehicle (not illustrated) on which the electric power steering device is mounted is acquired from the vehicle speed sensor 12. The calculation of the assist command value by the assist command value calculation portion 201 will be described below with reference to FIG. 3. The assist command value output from the assist command value calculation portion 201 is input to the gain setting portion 202. The gain setting portion 202 adjusts the assist command value based on a gain G1 set by a gain distribution portion 310 described below, and outputs the adjusted assist command value to the adder 400.

The driving support function control portion 300 is configured to include a subtractor 301, a steering angle control portion 302, a subtractor 303, a steering angular velocity control portion 304, a gain setting portion 305, a steering angular velocity calculation portion 306, and the gain distribution portion 310. The subtractor 301 subtracts the currently output steering angle from the target steering angle which is an input value. As a result, a steering angle deviation as a control amount can be obtained. The steering angle control portion 302 derives a target steering angular velocity based on the steering angle deviation output from the subtractor 301, and outputs the target steering angular velocity to the subtractor 303. The subtractor 303 subtracts the steering angular velocity output from the steering angular velocity calculation portion 306 from the target steering angular velocity output from the steering angle control portion 302, and outputs the steering angular velocity deviation to the steering angular velocity control portion 304. The steering angular velocity control portion 304 calculates a command value based on a steering angular velocity deviation output from the subtractor 303, and outputs the command value to the gain setting portion 305. The gain setting portion 305 adjusts the command value based on a gain G2 set by the gain distribution portion 310, and outputs the adjusted command value to the adder 400. The steering angular velocity calculation portion 306 calculates the steering angular velocity based on the currently output steering angle, and outputs the steering angular velocity to the subtractor 303.

The gain distribution portion 310 distributes the gain used in the normal assist control portion 200 and the driving support function control portion 300. When the ADAS function is not operating, the steering control by the driving support function control portion 300 does not operate. Therefore, the gain G1 on the normal assist control portion 200 side is set to 100%, and the gain G2 on the driving support function control portion 300 side is set to 0%. On the other hand, when the ADAS function is operating, the steering control by the driving support function control portion 300 is operating. Therefore, for example, the gain G1 on the normal assist control portion 200 side is set to 40?, and the gain G2 on the driving support function control portion 300 side is set to 60%. The distribution ratio (mixing ratio) here is not particularly limited, and may vary depending on, for example, an operating function among various functions (lane maintenance function, lane change function, and the like) provided by the ADAS function.

In the configuration of FIG. 2, for the purpose of controlling the steering angular velocity, the subtractor 303, the steering angular velocity control portion 304, and the steering angular velocity calculation portion 306 are included, but these may be omitted. In that case, the command value is calculated at the steering angle control portion 302, and the command value is input to the gain setting portion 305.

In the present embodiment, an example in which the driving support function control portion 300 is steering-angle-controlled based on the target steering angle is described, but the present invention is not limited to this. The driving support function control portion 300 may be configured such that, for example, the target support torque is input as the target command value and the corresponding command value is calculated. In that case, the driving support function control portion 300 includes various control portions and calculation portions corresponding to the target support torque.

Figure 3:
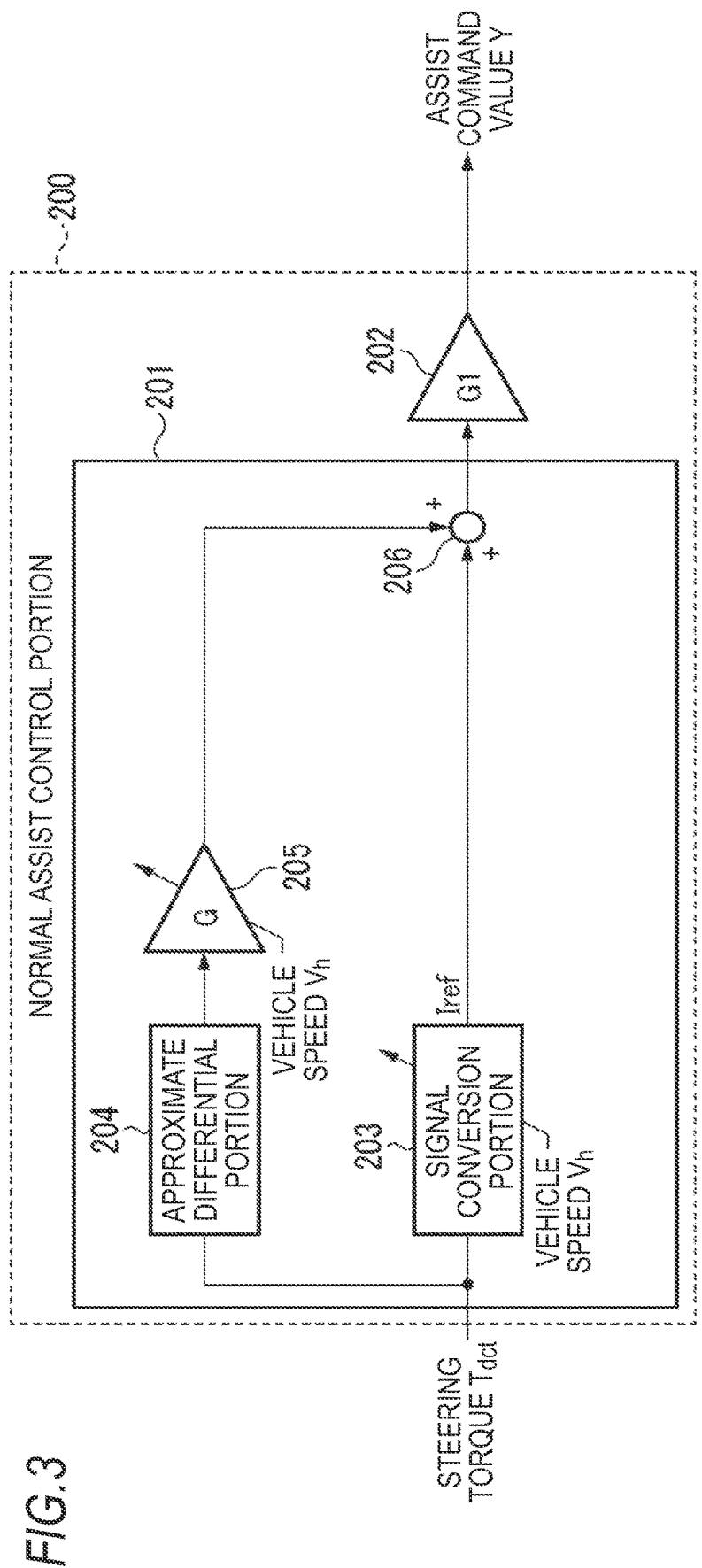
FIG. 3 is a block diagram illustrating an example of a functional configuration of a normal assist based on a steering torque.

FIG. 3 is a schematic diagram for explaining a vibration suppression function of the normal assist control portion 200. The normal assist control portion 200 is configured to include a signal conversion portion 203, an approximate differential portion 204, a gain setting portion 205, and an adder 206.

Figure 4:
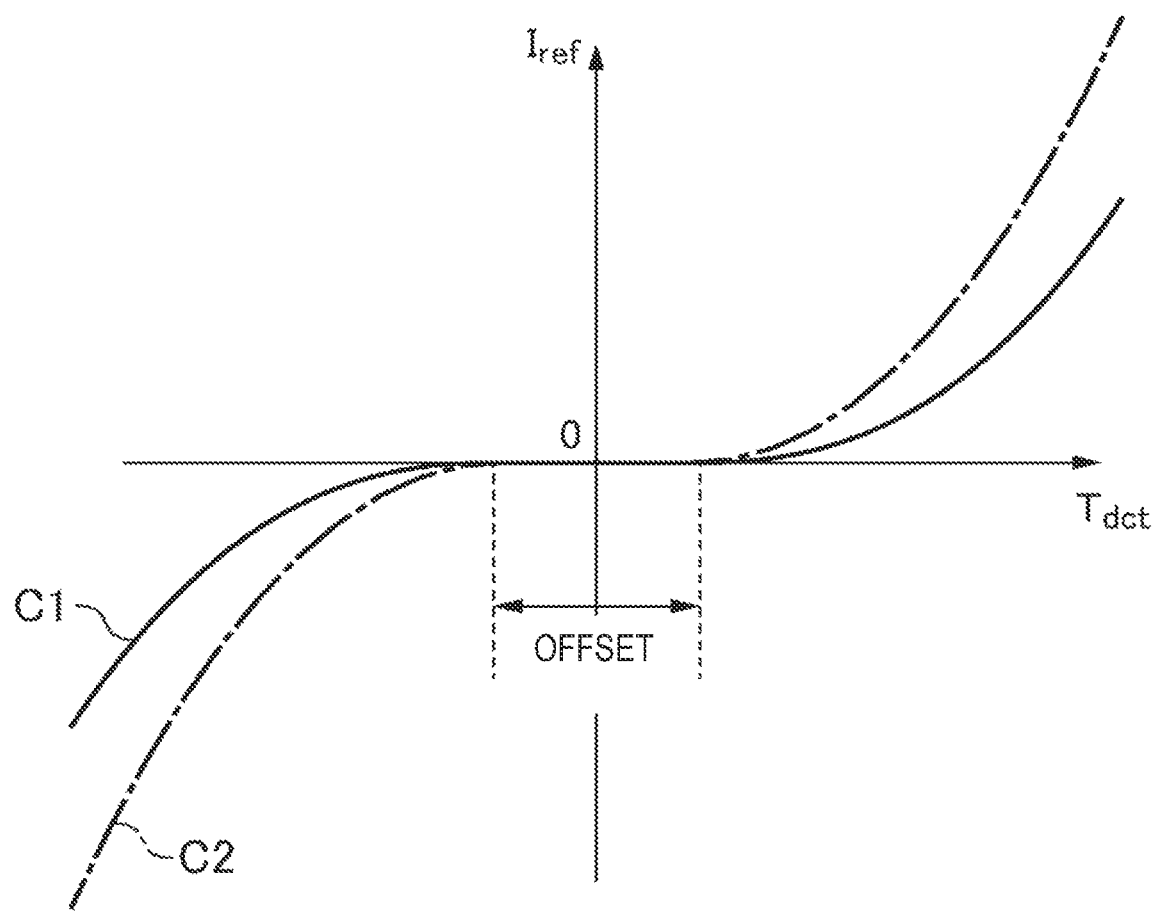
FIG. 4 is a diagram illustrating a configuration example of a conversion table according to a present embodiment.

The signal conversion portion 203 holds a table in which a correspondence relationship between the input steering torque $T_{dct}$ and an output command value $I_{ref}$ is defined in advance. Then, the signal conversion portion 203 refers to the table and derives the command value $I_{ref}$ corresponding to the input steering torque $T_{dct}$. FIG. 4 illustrates an example of the table used in the signal conversion portion 203. When the steering torque $T_{dct}$ is near zero, the command value $I_{ref}$ is also set to zero. This is to prevent output due to an offset within a predetermined range from a reference position of the steering torque $T_{dct}$, and when the value of the steeling torque $T_{dot}$ is small, the command value $I_{ref}$ is controlled not to be output. The range of the steering torque $T_{dct}$ in which the command value $I_{ref}$ is set to zero is not particularly limited, but is defined in advance. The command value $I_{ref}$ derived by the signal conversion portion 203 is output to the adder 206.

The correspondence relationship between the steering torque $T_{dct}$ and the command value $I_{ref}$ may change depending on the vehicle speed $V_h$ of the vehicle (not illustrated) on which the electric power steering device is mounted. FIG. 4 illustrates two curves C1 and C2 showing the correspondence relationship. The curve C2 is a curve showing the correspondence relationship between the steering torque $T_{dct}$ and the command value $I_{ref}$ when the vehicle speed $V_h$ is slower. As illustrated in FIG. 4, as the vehicle speed $V_h$ decreases, the value of the command value $I_{ref}$ is controlled to be larger even when the steering torque $T_{dct}$ is the same. In other words, when the vehicle speed $V_h$ is high, even when the same steering torque $T_{dct}$ is input, the command value $I_{ref}$ is suppressed and output as compared with the case where the vehicle speed $V_h$ is low. Although an example using the table is illustrated here, the command value $I_{ref}$ to be output may be derived by using a conversion formula specified in advance instead of the table.

The normal assist control portion 200 further includes the approximate differential portion 204 and the gain setting portion 205. The approximate differential portion 204 derives a command value by performing an approximate differentiation with respect to the amount of change in the input steering torque $T_{dct}$. For this differential value, the gain setting portion 205 applies a gain U defined based on the vehicle speed $V_h$ obtained from the vehicle speed sensor 12. Then, the gain setting portion 205 outputs the command value to the adder 206. The adder 206 adds the command value $I_{ref}$ derived with reference to the table as illustrated in FIG. 4 and the command value obtained from the gain setting portion 205, and outputs the added value to the gain setting portion 202 as the assist command value. The approximate differential portion 204 and the gain setting portion 205 generate a command value for suppressing vibration caused by disturbance or the like, and reflect the generated command value in the command value $I_{ref}$. For example, when the torsion bar 9 illustrated in FIG. 1 is twisted by disturbance, a command value for controlling in a direction of eliminating the twist is generated by the approximate differential portion 204 and the gain setting portion 205.

In the configuration illustrated in FIG. 3, the normal assist control portion 200 reflects the command value for vibration suppression in the command value $I_{ref}$. On the other hand, when the driving support function control portion 300 operates in response to the operation of the ADAS function or the like, depending on the gain distributed by the gain distribution portion 310, the command value for vibration suppression is also reduced, and as a result, the vibration suppression function is reduced. Therefore, in the present embodiment, a configuration is provided to suppress the reduction of the command value for suppressing the vibration. FIG. is a block diagram illustrating an example of a functional configuration of the electric power steering device according to the present embodiment. As a difference from FIG. 2, a filter portion 210 is provided in the normal assist control portion 200.

Figure 5:
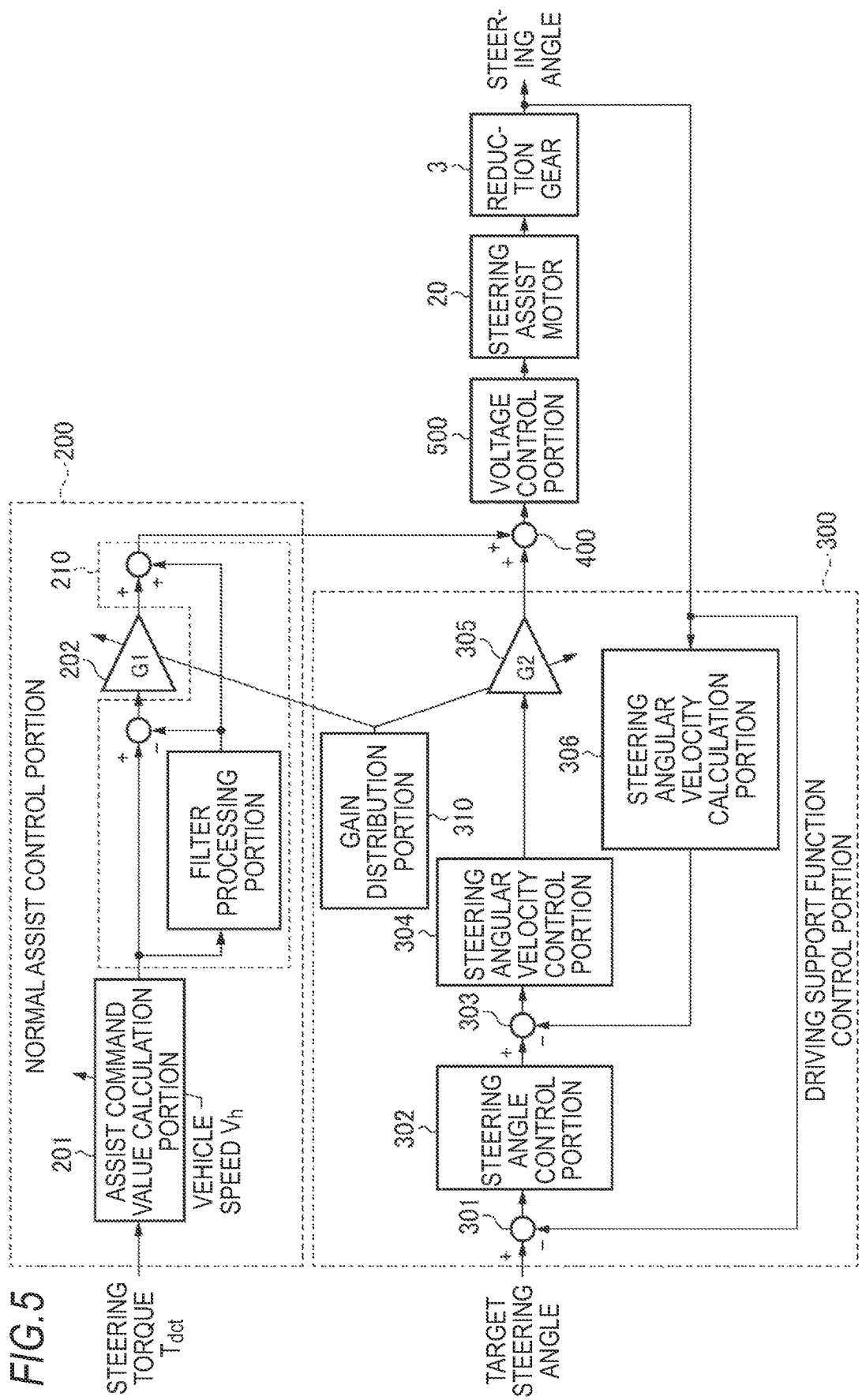
FIG. 5 is a block diagram illustrating an example of a functional configuration according to a first embodiment of the present invention.
Figure 6:
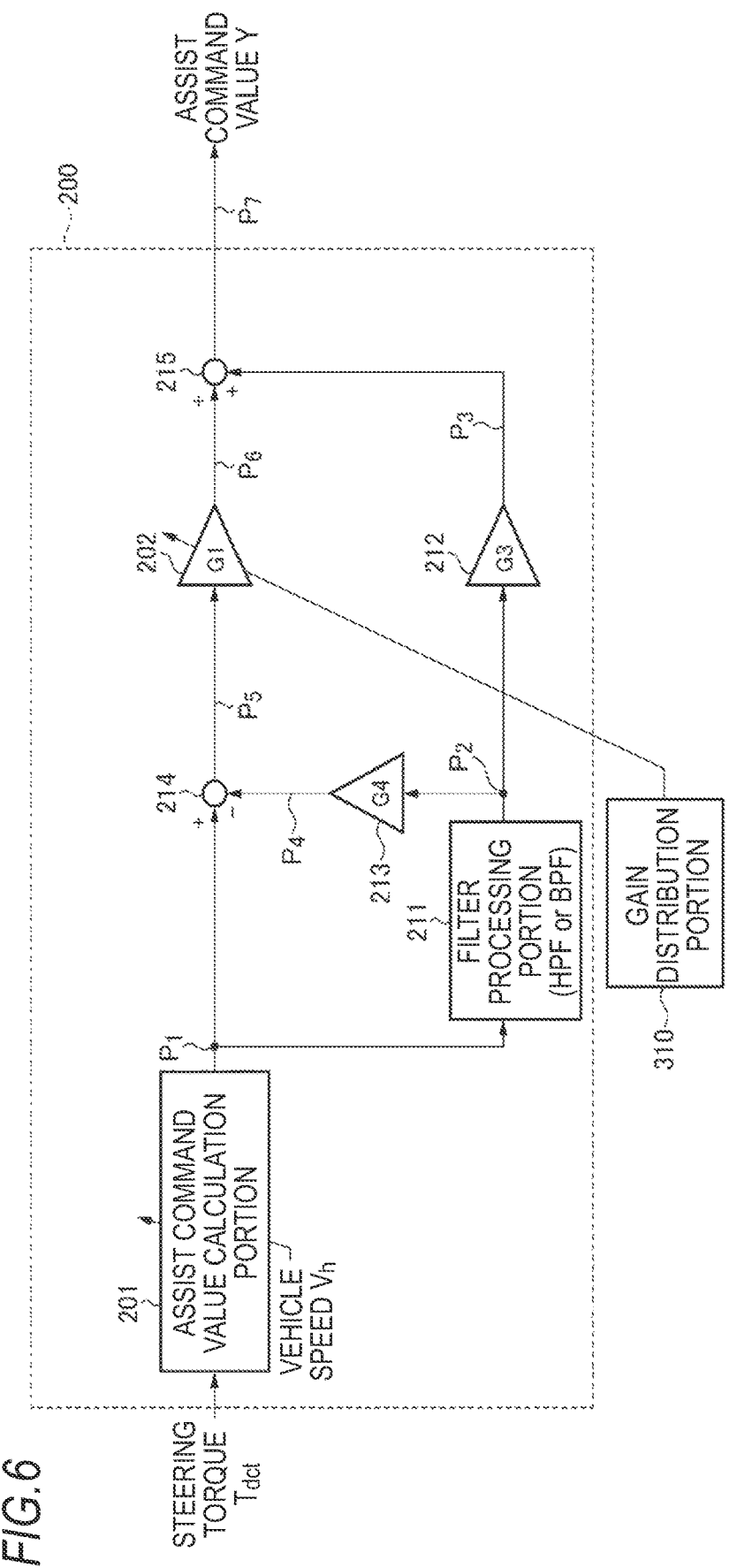
FIG. 6 is a block diagram illustrating an example of a functional configuration on a normal assist side according to the first embodiment of the present invention.

FIG. 6 is a diagram illustrating more specifically the functional configuration of the normal assist control portion 200 illustrated in FIG. 5. The filter portion 210 is configured to include a filter processing portion 211, a gain setting portion 212, a gain setting portion 213, a subtractor 214, and an adder 215. In FIG. 6, in order to explain the transition of the command value on a route, positions $P_1$ to $P_7$ on the route are illustrated for convenience.

The filter processing portion 211 is composed of a high pass filter (HPF) or a band pass filter has a set cutoff frequency, and is configured to pass a predetermined frequency component. The predetermined frequency component here is a frequency component corresponding to the command value for vibration suppression. When using the high pass filter, the cutoff frequency may be in a range of 8 Hz to 15 Hz. When using the band pass filter, a pass band may be in a range of 8 Hz to 15 Hz. This assumes that the natural frequency of the electric power steering device takes a value of around 10 Hz, and the value corresponding to this is used as the frequency of the pass band. The natural frequency of the electric power steering device described above is an example, and may differ depending on the configuration of the electric power steering device and the like. The assist command value calculation portion 201 outputs a command value including a command value A (corresponding to the command value $I_{ref}$ output from the signal conversion portion 203 in 3) for static assist assistance and a command value $V_1$ (corresponding to the command value output from the gain setting portion 205 in FIG. 3) for vibration suppression based on the steering torque $T_{dct}$. The operation of the assist command value calculation portion 201 is as described with reference to FIG. 3.

The gain setting portion 212 applies a gain G3 to the command value of the frequency component passed in the filter processing portion 211 and outputs the command value to the adder 215. The gain setting portion 213 applies a gain G4 to the command value of the frequency component passed in the filter processing portion 211 and outputs the command value to the subtractor 214. The subtractor 214 subtracts the command value of the frequency component output from the gain setting portion 213 from the command value output from the assist command value calculation portion 201, and outputs the command value to the gain setting portion 202. The adder 215 adds the command value output from the gain setting portion 202 and the command value output from the gain setting portion 212, and outputs the command value to the adder 400.

The signal values of the positions $P_1$ to $P_7$ on the route in the normal assist control portion 200 illustrated in FIG. 6 are as follows. The signal values are shown together with the symbols in FIG. 6.

Y: Assist command value output from normal assist control portion 200
A: Command value calculated based on steering torque for static assist assistance
$V_1$: Command value for vibration suppression to be added command value A
$V_2$: Command value of frequency component that has passed through HPF or BPF
G1: Gain set in gain setting portion 202
G3: Gain set in gain setting portion 212
G4: Gain set in gain setting portion 213

$$P_1 = A + V_1$$

$$P_2 = V_2$$

$$P_3 = G3 * V_2$$

$$P_4 = G4 * V_2$$

$$P_5 = A + V_1 - G4 * V_2$$

$$P_6 G1 * (A + V_1 - G4 * V_2)$$

$$P_7 = G3 * V_2 + G1 * (A + V_1 - G4 * V_2) = Y$$

When Y is rearranged, $$Y = G1 * A + G1 * V_1 + (G3 - G1 * G4) * V_2 \quad (1)$$

is satisfied. Here, the second and third terms on the right side correspond to the command values for vibration suppression, and $V_1 = V_2$ is satisfied in the pass band of the filter processing portion 211. That is, only the command values for vibration suppression are extracted and output from the filter processing portion 211. Ideally, the command values of the second and third terms of Equation (1) are output as they are as the command value of Y. Excluding the terms related to the static component A, Equation (1) can be rewritten as in Equation (2).

$$G1 * V_1 + (G3 - G1 * G4) * V_1 = V_1 \quad (2)$$

$$G1 + (G3 - G1 * G4) = 1 \quad (3)$$

$$G3 = 1 - G1 * (1 - G4) \quad (4)$$

The configuration may be such that the gain setting portion 213 and the subtractor 214 illustrated in FIG. 6 are omitted. In this case, G4=0 is satisfied, and based on Equation (4), $$G3 = 1 - G1 \quad (5)$$

is satisfied. In this case, the gain G3 of the gain setting portion 212 is defined according to the gain G1 of the gain setting portion 202. For example, when the gain G1 of the gain setting portion 202 is 40%, the gain G3 of the gain setting portion 212 is 60%.

On the other hand, when the subtractor 214 or the like is not omitted and G4=1, based on Equation (4), $$G3 = 1 \quad (6)$$

is satisfied. In this case, the processing by the gain setting portion 212 and the gain setting portion 213 is omitted, and the configuration is the same as when the output of the filter processing portion 211 is directly output to the adder 215 and the subtractor 214.

Processing Flow

Figure 7:
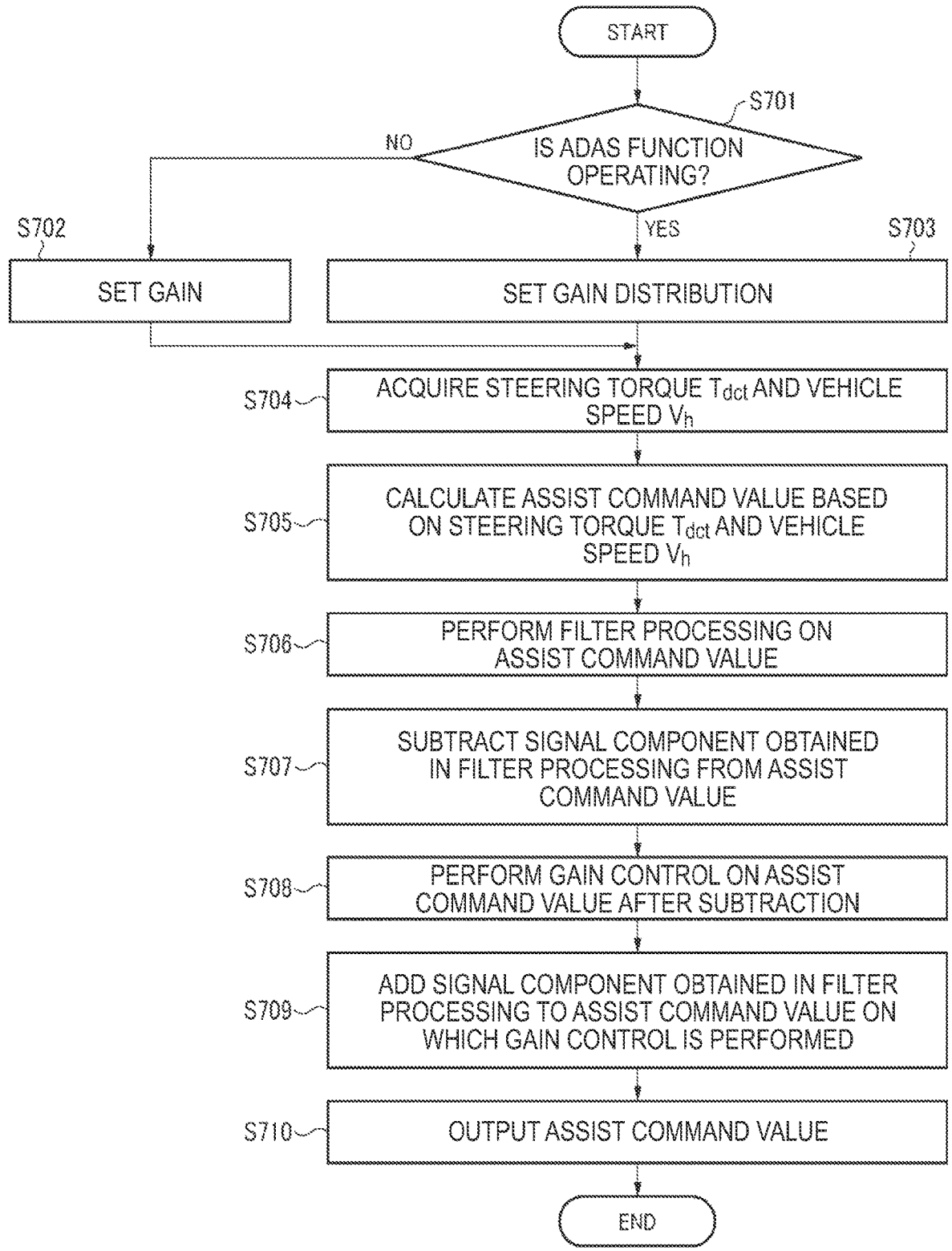
FIG. 7 is a flowchart of processing according to the first embodiment of the present invention.

FIG. 7 is a flowchart of processing by the EPS-ECU 30 according to the present embodiment. As described above, this processing flow is realized by, for example, reading and executing a program stored in a storage device (not illustrated) by a CPU (not illustrated) included in the EPS-ECU 30.

In S701, the EPS-ECU 30 determines whether the ADAS function is operating. The EPS-ECU 30 may determine whether the ADAS function to be determined here is operating for the ADAS function related to the control of the electric power steering device, or may determine whether the ADAS function to be determined here is operating for the entire ADAS function. When the ADAS function is operating (YES in S701), the processing of the EPS-ECU 30 proceeds to S703. On the other hand, when the ADAS function is not operating (NO in S701), the processing of the EPS-ECU 30 proceeds to S702.

In S702, the EPS-ECU 30 sets the gain G1 of the gain setting portion 202 of the normal assist control portion 200 to 100% by the gain distribution portion 310. In this case, the driving support function control portion 300 does not work. Therefore, the gain G2 of the gain setting portion 305 of the driving support function control portion 300 is set to 0%. Then, the processing of the EPS-ECU 30 proceeds to S704.

In S703, the EPS-ECU 30 distributes the gain to the gain G1 of the gain setting portion 202 of the normal assist control portion 200 and the gain G2 of the gain setting portion 305 of the driving support function control portion 300 by the gain distribution portion 310. As the distribution ratio, a ratio specified according to the type of the ADAS function determined to be operating in S701 may be used, or a constant ratio may be used regardless of the type of ADAS function. Then, the processing of the EPS-ECU 30 proceeds to S704.

In S704, the EPS-ECU 30 acquires the steering torque $T_{dct}$ and the vehicle speed $V_h$ from various sensors.

In S705 the EPS-ECU 30 derives the assist command value by the normal assist control portion 200 based on the steering torque $T_{dct}$ and the vehicle speed $V_h$ acquired in S704. The derivation method here is the same as that described with reference to FIGS. 3 and 4.

In S706, the EPS-ECU 30 filters the assist command value derived in S705 by the filter processing portion 211. As described above, the filtering process may use HIT or BPF. The command value obtained here corresponds to the command value for vibration suppression given in the assist command value calculation portion 201.

In S707, the EPS-ECU 30 subtracts the command value obtained in S706 from the assist command value obtained in S705. This step corresponds to the operation of the subtractor 214 illustrated in FIG. 6.

In S708 the EPS-ECU 30 controls the gain of the command value obtained in S707 by the gain setting portion 202.

In S709, the EPS-ECU 30 adds the command value obtained in S706 to the command value for which the gain is controlled in S708. This step corresponds to the operation of the adder 215 illustrated in FIG. 6.

In S710, the EPS-ECU 30 outputs the assist command value obtained in S709 to the adder 400. In this case, when the ADAS function is operating, the adder 400 adds the command value output from the driving support function control portion 300 and the assist command value obtained in S709, and outputs the command value to the voltage control portion 500. On the other hand, when the ADAS function is not operating, the command value is not output from the driving support function control portion 300 side, so the adder 400 outputs the assist command value obtained in S709 as it is to the voltage control portion 500. Then, the voltage control portion 500 outputs a voltage control command value $V_{ref}$ for controlling the steering assist motor 20 based on the input command value. Then, this processing flow is ended.

Next, the steering assist motor 20 is controlled based on the voltage control command value Niter, and as a result of the reduction gear 3 operating, the electric power steering device operates so as to have a predetermined steering angle.

As described above, according to the present embodiment, it is possible to efficiently suppress vibration with a simple configuration in consideration of the driving support function. In particular, it is possible to suppress the reduction of the signal component for vibration suppression by the normal assist control portion as the ADAS function or the like operates. As a result, vibration caused by disturbance or the like can be suppressed regardless of the operating state of the driving support function, and thus the operability of the driver can be maintained. Further, since the assist command value based on the steering torque is reduced, the influence on the control based on the ADAS function or the like can be suppressed. Further, since the vibration can be appropriately suppressed, the hands-on or hands-off detection used for the ADAS function or the like can be accurately executed.

Second Embodiment

In the first embodiment, an embodiment is described on the premise that the gain is distributed to the normal assist control portion 200 and the driving support function control portion 300 by the gain distribution portion 310. In the present embodiment, an embodiment assuming a configuration in which a dead zone setting portion 320 is used instead of the gain distribution portion 310 will be described. The description of the portion overlapping with that of the first embodiment will be omitted, and the description will be given focusing on the difference.

Functional Configuration

Figure 8:
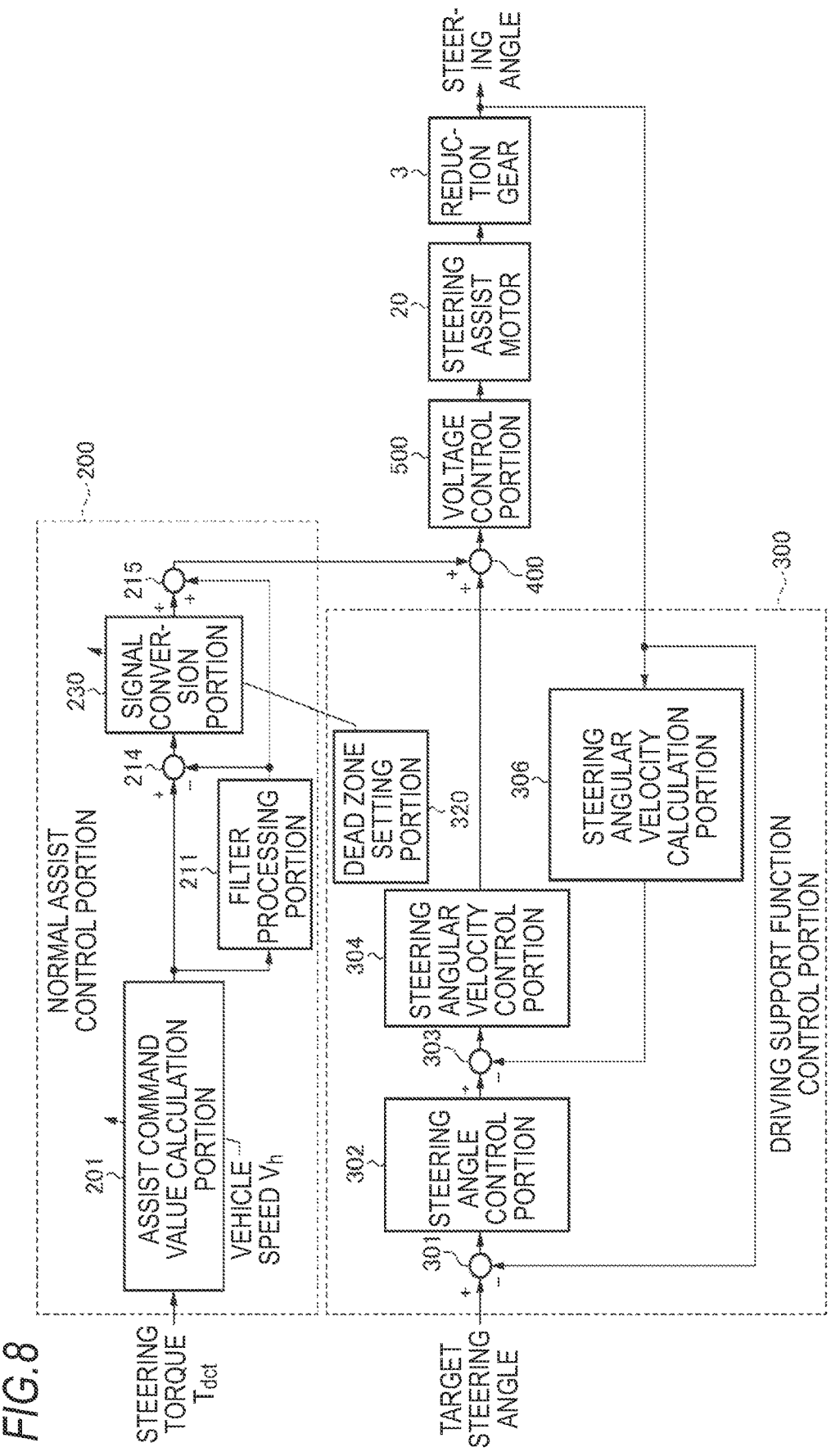
FIG. 8 is a block diagram illustrating an example of a functional configuration according to a second embodiment of the present invention.

FIG. 8 is a block diagram illustrating an example of a functional configuration of an electric power steering device according to the present embodiment. As a difference from FIG. illustrated in the first embodiment, the normal assist control portion 200 includes a signal conversion portion 230 instead of the gain setting portion 202. In the driving support function control portion 300, the gain setting portion 305 is omitted. The dead zone setting portion 320 for controlling a parameter (dead zone) of the signal conversion portion 230 is provided. Although the dead zone setting portion 320 is illustrated to be included in the driving support function control portion 300 in FIG. 8, the dead zone setting portion 320 may be provided outside the driving support function control portion 300.

Figure 9A:
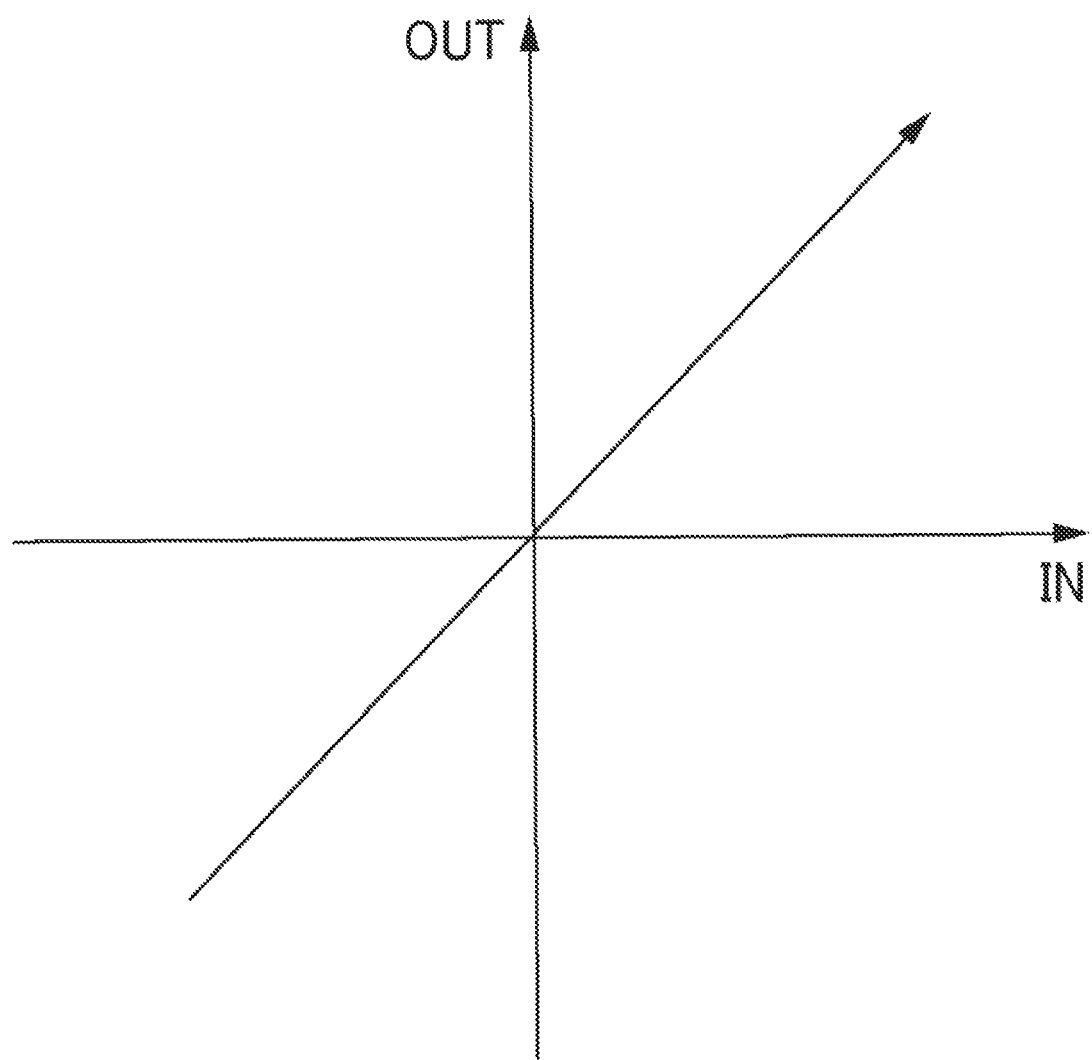
FIG. 9A is a diagram illustrating a configuration example of a conversion table according to the second embodiment of the present invention.
Figure 9B:
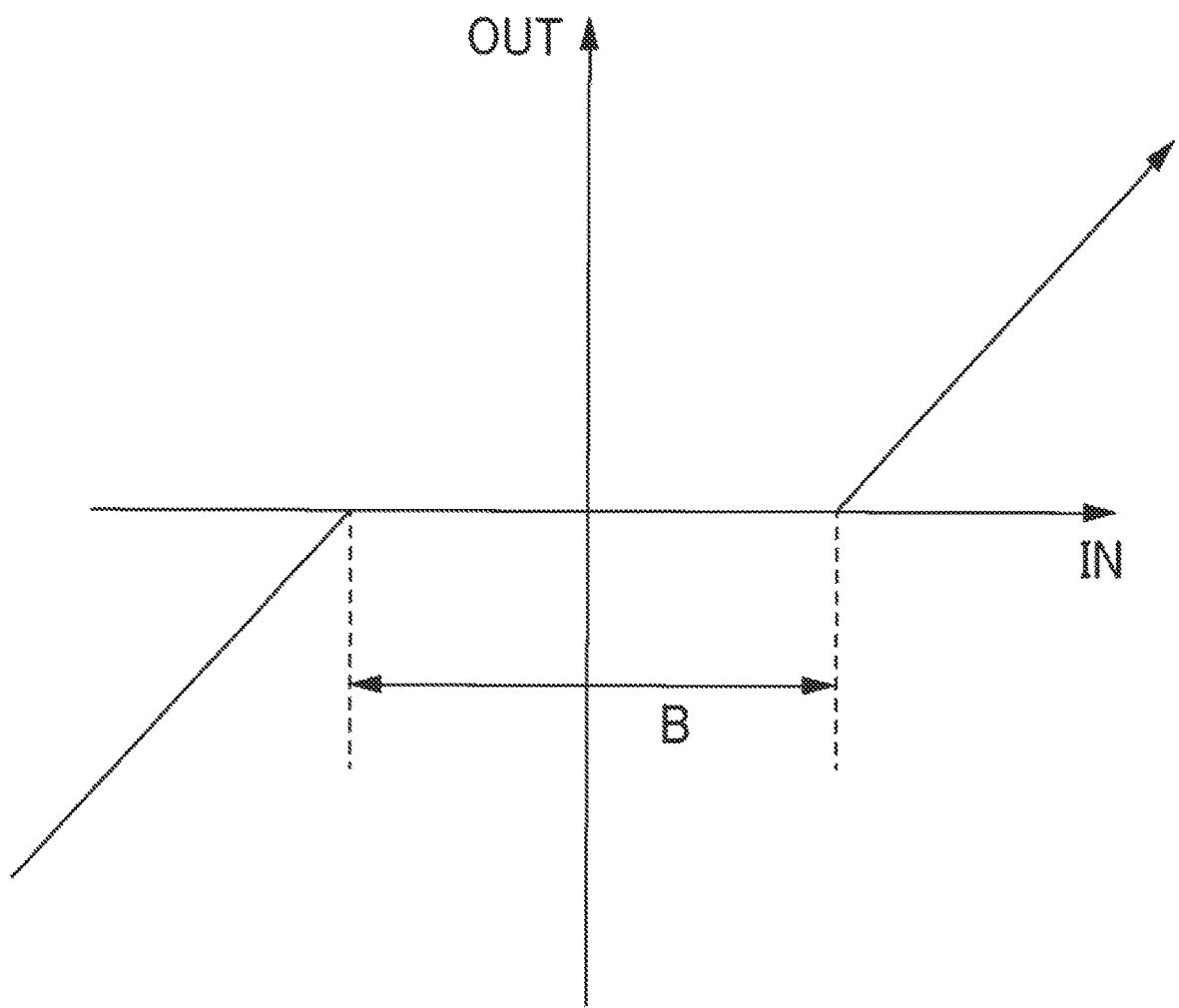
FIG. 9B is a diagram illustrating the configuration example of the conversion table according to the second embodiment of the present invention.

The signal conversion portion 230 converts the command value input from the subtractor 214 and outputs the converted command value to the adder 215. FIGS. 9A and 9B are diagrams illustrating examples of a conversion table used in the signal conversion portion 230. In FIGS. 9A and 9B, the horizontal axis represents the input and the vertical axis represents the output. FIG. 9A illustrates an example of a conversion table when the ADAS function is not operating. FIG. 9B illustrates an example of a conversion table when the ADAS function is operating. In the present embodiment, when the ADAS function is operating, a dead zone B which outputs zero is set with respect to the input as illustrated in FIG. 9B. In the example of FIG. 9A, the width of the dead zone B is zero, and in the example of FIG. 9B, the width of the dead zone B is set to be larger than zero. The width of the dead zone B is not particularly limited, but a ratio specified according to the type of the operating ADAS function may be used, or a constant ratio may be used regardless of the type of the ADAS function. Although an example of a conversion table in which a dead zone is set is shown here, another conversion method such as a conversion formula in which conversion conditions corresponding to the dead zone are defined may be used.

The dead zone setting portion 320 sets the dead zone B in the signal conversion portion 230 of the normal assist control portion 200 according to the presence or absence of the operation of the ADAS function.

Processing Flow

Figure 10:
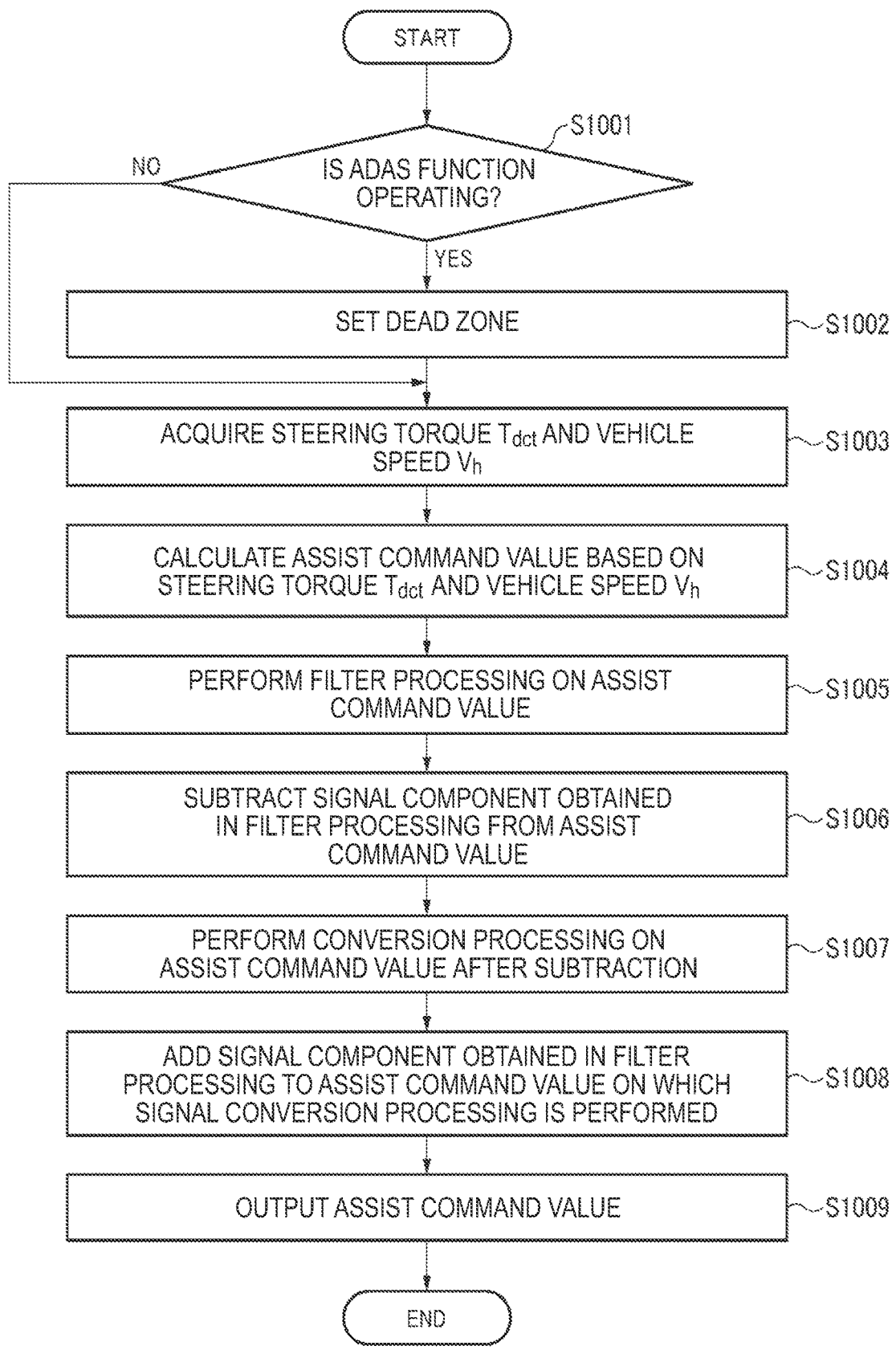
FIG. 10 is a flowchart of processing according to the second embodiment of the present invention.

FIG. 10 is a flowchart of processing by the EPS-ECU 30 according to the present embodiment. As described above, this processing flow is realized by, for example, reading and executing a program stored in a storage device (not illustrated) by a CPU (not illustrated) included in the EPS-ECU 30.

In S1001, the EPS-ECU 30 determines whether the ADAS function is operating. The EPS-ECU 30 determines may determine whether the ADAS function to be determined here is operating for the ADAS function related to the control of the electric power steering device, or may determine whether the ADAS function to be determined here is operating for the entire ADAS function. When the ADAS function is operating (YES in S1001), the processing of the EPS-ECU 30 proceeds to S1002, On the other hand, when the ADAS function is not operating (NO in S1001), the processing of the EPS-ECU 30 proceeds to S1003.

In S1002, the EPS-ECU 30 sets the dead zone B of the signal conversion portion 230 of the normal assist control portion 200 by the dead zone setting portion 320. In the present embodiment, as illustrated in FIG. 9B, the dead zone B having a predetermined width is set. When the dead zone B is not set here, the conversion table as illustrated in FIG. 9A is used. Then, the processing of the EPS-ECU 30 proceeds to S1003.

In S1003, the EPS-ECU 30 acquires the steering torque $T_{dct}$ and the vehicle speed $V_h$ from various sensors.

In S1004, the EPS-ECU 30 derives an assist command value by the normal assist control portion 200 based on the steering torque $T_{dct}$ and the vehicle speed $V_h$ acquired in S1003. The derivation method here is the same as that described with reference to FIGS. 3 and 4 in the first embodiment.

In S1005, the EPS-ECU 30 filters the assist command value derived in S1004 by the filter processing portion 211. As described in the first embodiment, the filtering process may use HPF or BPF. The command value obtained here corresponds to the command value for vibration suppression given in the assist command value calculation portion 201.

In S1006, the EPS-ECU 30 subtracts the command value obtained in S1005 from the assist command value obtained in S1004. This step corresponds to the operation of the subtractor 214 illustrated in FIG. 8.

In S1007, the EPS-ECU 30 performs signal conversion processing on the command value obtained in Si 006 by the signal conversion portion 230. Here, the signal conversion portion 230 converts the input signal using the conversion table exemplified in FIG. 9A or 9B.

In S1008, the EPS-ECU 30 adds the command value obtained in S1005 to the command value on which the signal conversion processing is performed in S1007. This step corresponds to the operation of the adder 215 illustrated in FIG. 8.

In S1009, the EPS-ECU 30 outputs the assist command value obtained in S1008 to the adder 400. In this case, when the ADAS function is operating, the adder 400 adds the command value output from the driving support function control portion 300 and the assist command value obtained in S1008, and outputs the command value to the voltage control portion 500. On the other hand, when the ADAS function is not operating, since the command value is not output from the driving support function control portion 300 side, the adder 400 outputs the assist command value obtained in S1008 as it is to the voltage control portion 500. Then, the voltage control portion 500 outputs the voltage control command value $V_{ref}$ for controlling the steering assist motor 20 based on the input command value. Then, this processing flow is ended.

Then, the steering assist motor 20 is controlled based on the voltage control command value $V_{ref}$, and as a result of the reduction gear 3 operating, the electric power steering device operates so as to have a predetermined steering angle.

As described above, according to the present embodiment, it is possible to efficiently suppress the vibration with a simple configuration in consideration of the driving support function as in the first embodiment. In particular, it is possible to suppress the reduction of the signal component for vibration suppression by the normal assist control portion as the ADAS function or the like operates. As a result, vibration caused by disturbance or the like can be suppressed regardless of the operating state of the driving support function, and thus the operability of the driver can be maintained. Further, since the assist command value based on the steering torque is reduced, the influence on the control based on the ADAS function or the like can be suppressed. Further, since the vibration can be appropriately suppressed, the hands-on or hands-off detection used for the ADAS function or the like can be accurately executed.

Other Embodiments

The configuration of the electric power steering device is not limited to the configuration illustrated in FIG. 1. For example, the electric power steering device may be configured by a steer-by-wire (SBW) mechanism in which the steering wheel 1 side and the pinion rack mechanism 5 side are mechanically separated.

The present invention can also be realized by supplying programs or applications for realizing the functions of one or more embodiments described above to a system or a device using a network or a storage medium, and reading and executing the program by one or more processors in the computer of the system or the device.

As described above, the present invention is not limited to the above embodiments. The present invention is intended to be modified and applied by those skilled in the art based on the mutual combination of the configurations of the embodiments, the description of the specification, and the well-known technique, and is included in the scope of seeking protection.

As described above, the following matters are disclosed in this specification.

(1) A control device (for example, 30) for an electric power steering device, including:

a first control portion (for example, 200) that derives a first command value based on a steering torque applied to a steering shaft of the electric power steering device;

a second control portion (for example, 300) that derives a second command value based on a target command value for a driving support function; and a synthesizing portion (for example, 400) that synthesizes the first command value and the second command value to generate a command value of the electric power steering device, where the first control portion includes, a derivation portion (for example, 201) which derives a command value including a vibration suppression component from the steering torque, an extraction portion (for example, 211) which extracts a command value corresponding to the vibration suppression component from the command value derived by the derivation portion, an adjustment portion (for example, 202) which adjusts the command value derived by the derivation portion according to an operation state of a function of the second control portion, and an addition portion (for example, 215) which generates the first command value by adding the command value extracted by the extraction portion to the command value adjusted by the adjustment portion.

According to this configuration, it is possible to efficiently suppress vibration with a simple configuration in consideration of the driving support function. In particular, it is possible to suppress the reduction of the signal component for vibration suppression by the normal assist control portion as the ADAS function or the like operates. As a result, vibration caused by disturbance or the like can be suppressed regardless of the operating state of the driving support function, and thus the operability of the driver can be maintained. Since the assist command value based on the steering torque is reduced, the influence on the control based on the ADAS function or the like can be suppressed. In addition, according to this configuration, it is not necessary to add a function for suppressing vibration to the second control portion. Therefore, it is possible to save resources (execution time and storage area) for executing additional functions.

(2) The control device for the electric power steering device according to (1), where the first control portion further includes, a subtraction portion (for example, 214) which sub tracts the command value extracted by the extraction portion from the command value derived by the derivation portion, and the adjustment portion adjusts a command value after being subject to subtraction by the subtraction portion.

According to this configuration, the vibration suppression component can be reflected in the command value of the electric power steering device with higher accuracy.

(3) The control device for the electric power steering device according to (1) or (2), where the adjustment portion adjusts the command value derived by the derivation portion based on a predetermined mixing ratio of the first command value and the second command value when the function of the second control portion is operating.

According to this configuration, each command value can be adjusted according to the operating state of the driving support, function.

(4) The control device for the electric power steering device according to (3), where
the second control portion controls the electric power steering device by an advanced driver-assistance systems (ADAS) function, and
the predetermined mixing ratio in the adjustment portion is defined according to a type of the ADAS function in operation.

According to this configuration, each command value can be adjusted according to the operation content of the ADAS function.

(5) The control device for the electric power steering device according to (1) or (2), where
the adjustment portion adjusts the command value derived by the derivation portion using a conversion condition in which a dead zone in a predetermined range is defined when the function of the second control portion is operating.

According to this configuration, each command value can be adjusted according to the operating state of the driving support function.

(6) The control device for the electric power steering device according to (5), where
the second control portion controls the electric power steering device by an advanced driver-assistance systems (ADAS) function, and
the dead zone in the adjustment portion is defined in the predetermined range according to a type of the ADAS function in operation.

According to this configuration, each command value can be adjusted according to the operation content of the ADAS function, (7) The control device for the electric power steering device according to any one of (1) to (6), where
the extraction portion uses a high pass filter to extract a command value of a predetermined frequency component.

According to this configuration, the vibration suppression component can be extracted using the high pass filter.

(8) The control device for the electric power steeling device according to (7), where
a cutoff frequency of the high pass filter is set in a range of 8 Hz to 15 Hz, According to this configuration, the vibration suppression component can be extracted using the frequency in the range of 8 Hz to 15 Hz, which is the natural frequency of the electric power steering device.

(9) The control device for the electric power steering device according to any one of (1) to (6), where
the extraction portion uses a band pass filter to extract a command value of a predetermined frequency component.

According to this configuration, the vibration suppression component can be extracted using the band pass filter.

(10) The control device for the electric power steering device according to (9), where
a pass band of the band pass filter is set in a range of 8 Hz to 15 Hz, According to this configuration, the vibration suppression component can be extracted using the frequency in the range of 8 Hz to 15 Hz, which is the natural frequency of the electric power steering device.

(11) The control device for the electric power steering device according to any one of (1) to (10), where
the target command value for the driving support function is a target steering angle or a target support torque.

According to this configuration, it is possible to suppress the reduction of the signal component for vibration suppression corresponding to the driving support function using the target steering angle or the target support torque as the target command value.

(12) A control method for an electric power steering device, including:
a first deriving step (for example, S704 to S709) of deriving a first command value based on a steering torque applied to a steering shaft of the electric power steering device;
a second deriving step (for example, 300) of deriving a second command value based on a target command value for a driving support function; and
a synthesizing step (for example, S710) of synthesizing the first command value and the second command value to generate a command value of the electric power steering device, wherein
in the first deriving step,
a command value including a vibration suppression component is derived from the steering torque (for example, S705),
a command value corresponding to the vibration suppression component is extracted from the derived command value (for example, S706),
the derived command value is adjusted according to an operation state of the second deriving step (for example, S708), and
the first command value is generated by adding the extracted command value to the adjusted command value (for example, S709).

According to this configuration, it is possible to efficiently suppress the vibration with a simple configuration in consideration of the driving support function. In particular, it is possible to suppress the reduction of the signal component for vibration suppression by the normal assist control portion as the ADAS function or the like operates. As a result, vibration caused by disturbance or the like can be suppressed regardless of the operating state of the driving support function, and thus the operability of the driver can be maintained. Since the assist command value based on the steering torque is reduced, the influence on the control based on the ADAS function or the like can be suppressed.

Although various embodiments are described above with reference to the drawings, it goes without saying that the present invention is not limited to such examples. It is clear that those skilled in the art can come up with various modification examples or amendment examples within the scope of the claims, which naturally belong to the technical scope of the present invention. Further, the components in the embodiments described above may be freely combined as long as the gist of the invention is not deviated. For example, the signal conversion portion 230 that perform dead zone processing and the gain setting portion 202 may be combined to form an adjustment portion that adjusts a command value including a vibration suppression component derived from the steering torque.

This application is based on a Japanese patent application filed on Dec. 23, 2020 (Japanese Patent Application No. 2020-213947), the contents of which are incorporated herein by reference.

REFERENCE SIGNS LIST

1: steering wheel
2: steering shaft
3: reduction gear
4a, 4b: universal joint
5: pinion rack mechanism
6a, 6b: tie rod
7a, 7b: hub unit
8L, 8R: steered vehicle wheel
9: torsion bar
10: torque sensor
11: ignition (ING) key
12: vehicle speed sensor
13: battery
14: steering angle sensor
20: steering assist motor
30: EPS (Electronic Power Steering)-ECU (Electronic Control Unit))
200: normal assist control portion
201: assist command value calculation portion
202: gain setting portion
210: filter portion
211: filter processing portion
212, 213, 305: gain setting portion
214, 301, 303: subtractor
215, 400: adder
230: signal conversion portion
300: driving support function control portion
302: steering angle control portion
304: steering angular velocity control portion
306: steering angular velocity calculation portion
310: gain distribution portion
320: dead zone setting portion
500: voltage control portion

The invention claimed is:

1. A control device for an electric power steering device, comprising:
a first control portion that derives a first command value based on a steering torque applied to a steering shaft of the electric power steering device;
a second control portion that derives a second command value based on a target command value for a driving support function; and
a synthesizing portion that synthesizes the first command value and the second command value to generate a command value of the electric power steering device, wherein
the first control portion includes:
a derivation portion which derives a command value including a vibration suppression component from the steering torque;
an extraction portion which extracts a command value corresponding to the vibration suppression component from the command value derived by the derivation portion;
an adjustment portion which adjusts the command value derived by the derivation portion according to an operation state of a function of the second control portion; and
an addition portion which generates the first command value by adding the command value extracted by the extraction portion to the command value adjusted by the adjustment portion.

2. The control device for the electric power steering device according to claim 1, wherein:
the first control portion further includes a subtraction portion which subtracts the command value extracted by the extraction portion from the command value derived by the derivation portion; and
the adjustment portion adjusts a command value after being subject to subtraction by the subtraction portion.

3. The control device for the electric power steering device according to claim 1, wherein
the adjustment portion adjusts the command value derived by the derivation portion based on a predetermined mixing ratio of the first command value and the second command value when the function of the second control portion is operating.

4. The control device for the electric power steering device according to claim 3, wherein:
the second control portion controls the electric power steering device by an advanced driver-assistance systems function; and
the predetermined mixing ratio in the adjustment portion is defined according to a type of the advanced driver-assistance systems function in operation.

5. The control device for the electric power steering device according to claim 1, wherein
the adjustment portion adjusts the command value derived by the derivation portion using a conversion condition in which a dead zone in a predetermined range is defined when the function of the second control portion is operating.

6. The control device for the electric power steering device according to claim 5, wherein:
the second control portion controls the electric power steering device by an advanced driver-assistance systems function; and
the dead zone in the adjustment portion is defined in the predetermined range according to a type of the advanced driver-assistance systems function in operation.

7. The control device for the electric power steering device according to claim 1, wherein
the extraction portion uses a high pass filter to extract a command value of a predetermined frequency component.

8. The control device for the electric power steering device according to claim 7, wherein
a cutoff frequency of the high pass filter is set in a range of 8 Hz to 15 Hz.

9. The control device for the electric power steering device according to claim 1, wherein
the extraction portion uses a band pass filter to extract a command value of a predetermined frequency component.

10. The control device for the electric power steering device according to claim 9, wherein
a pass band of the band pass filter is set in a range of 8 Hz to 15 Hz.

11. The control device for the electric power steering device according to claim 1, wherein
the target command value for the driving support function is a target steering angle or a target support torque.

12. A control method for an electric power steering device, comprising:
deriving a first command value based on a steering torque applied to a steering shaft of the electric power steering device;
deriving a second command value based on a target command for a driving support function; and synthesizing the first command value and the second command value to generate a command value of the electric power steering device, wherein when the first command value is derived, a command value including a vibration suppression component is derived from the steering torque, a command value corresponding to the vibration suppression component is derived from the derived command value, the derived command value is adjusted according to an operation state of the deriving of the second command value, and the first command value is generated by adding the extracted command value to the adjusted command value.

* * * * *